United States Patent [19]

Flot

[11] Patent Number: 4,883,162

[45] Date of Patent: Nov. 28, 1989

[54] BAG TURNING APPARATUS

[75] Inventor: James M. Flot, Irvine, Calif.

[73] Assignee: MHE Company, Inc., Santa Ana, Calif.

[21] Appl. No.: 252,057

[22] Filed: Sep. 30, 1988

[51] Int. Cl.⁴ ............................................ B65G 47/24
[52] U.S. Cl. ................................. 198/374; 198/395; 198/464.1; 198/859
[58] Field of Search ............... 198/374, 394, 395, 398, 198/399, 401, 464.1, 464.2, 859, 411, 858, 854, 855

[56]     References Cited
   U.S. PATENT DOCUMENTS 2,805,753  9/1957  Palmer ................................. 198/374
3,827,577  8/1974  Kurk et al. ...................... 198/411 X

FOREIGN PATENT DOCUMENTS 0125089  11/1984  European Pat. Off. ............ 198/394

Primary Examiner—Robert J. Spar
Assistant Examiner—Lyle K. Kimms
Attorney, Agent, or Firm—Klein & Szekeres

[57]                 ABSTRACT

A bag turner for rotating a bag having a front and side surface and moving along a path on a conveyor. The bag turner has a bag turning wheel having an axis of rotation substantially normal to the plane of the conveyor and offset to the side of the path of the bags. The wheel has a first and second radial member. Each the radial member extends from a hub on an axis in a horizontal plane to form a substantially right angle. The radial members engage a bag moving on the conveyor turn the bag as the wheel turns. A means for raising the bag turning wheel to permit free passage of the bags on the conveyor is provided.

20 Claims, 5 Drawing Sheets

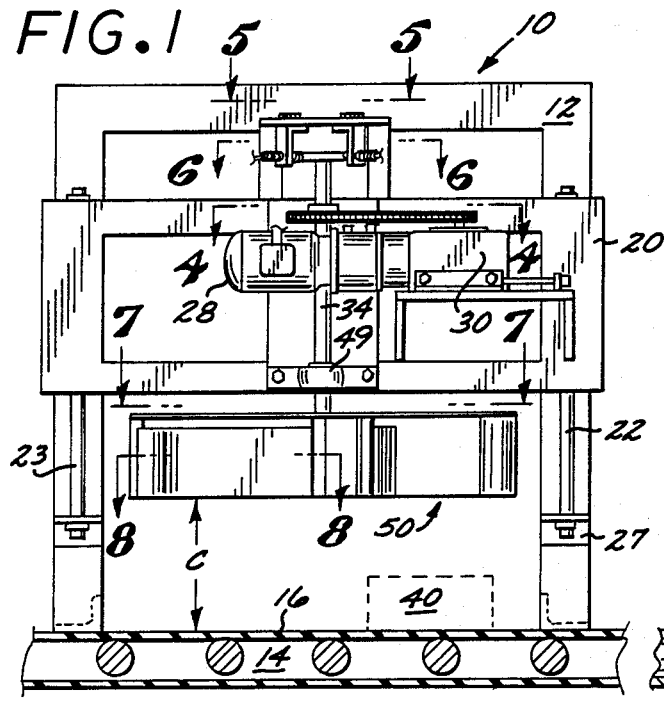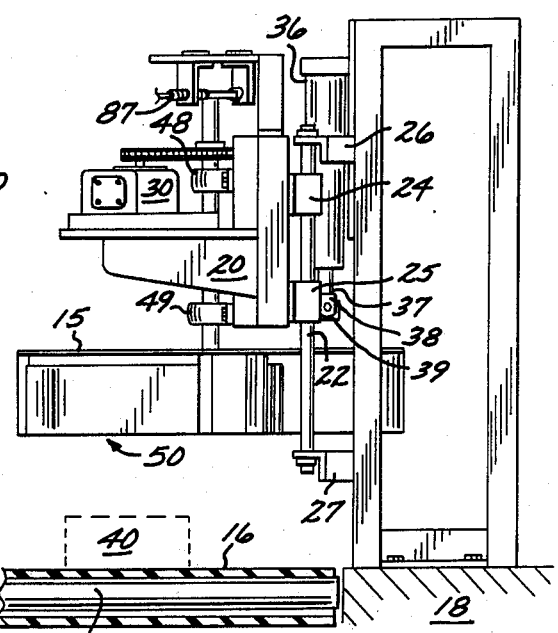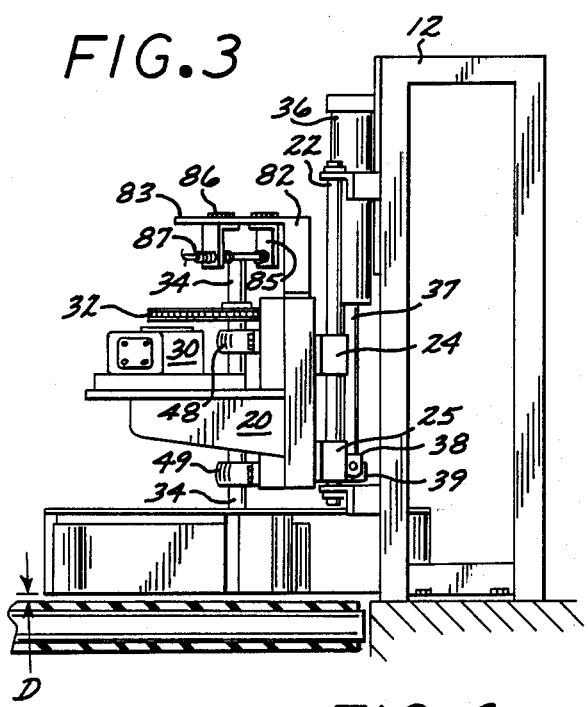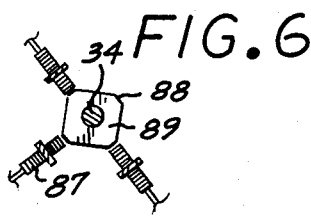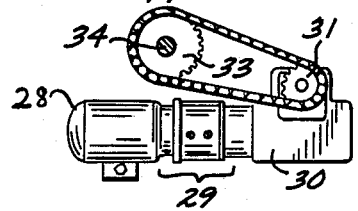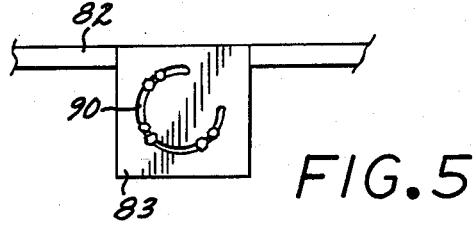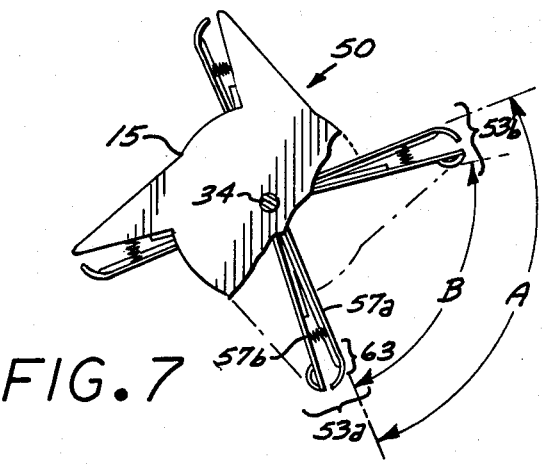

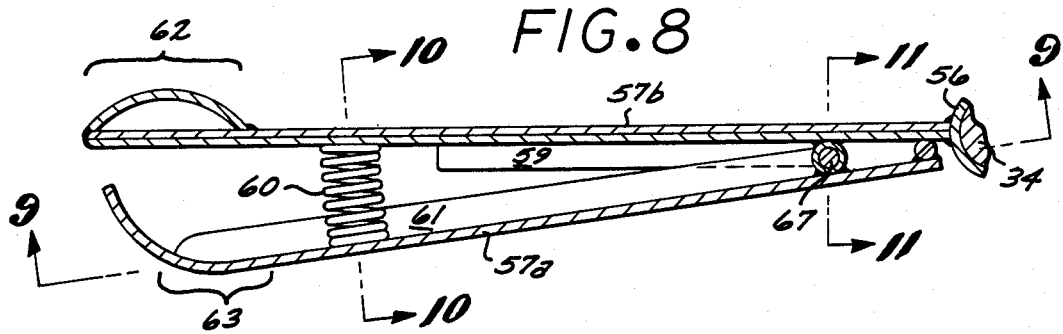
FIG.8
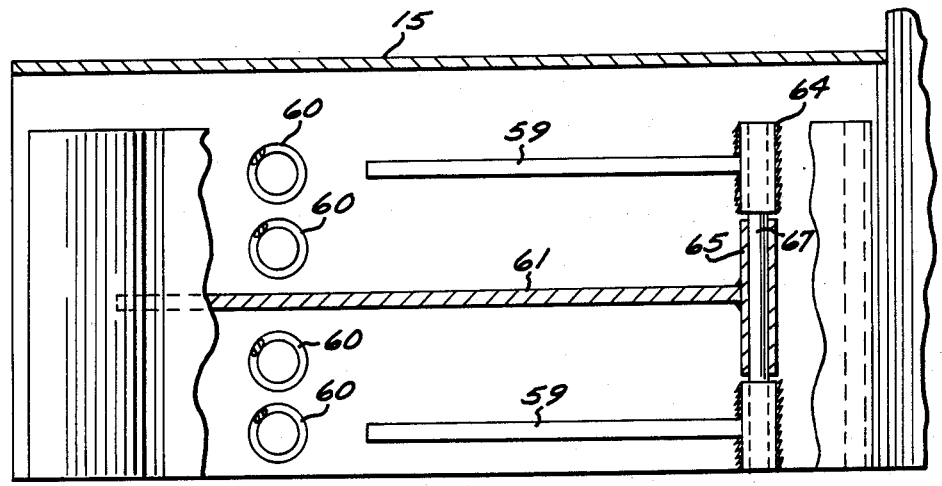
FIG.9
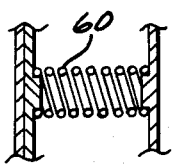
FIG.10
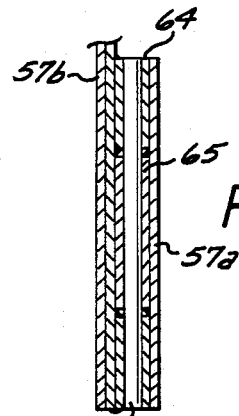
FIG.11
FIG.12
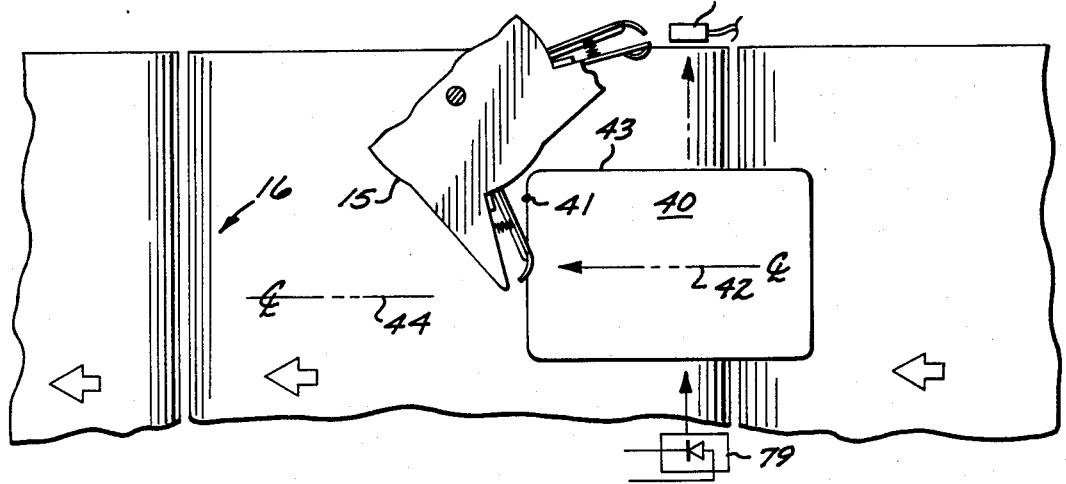

4,883,162

BAG TURNING APPARATUS

BACKGROUND

1. Field of the Invention

This invention relates to the field of systems for moving and stacking paper or plastic bags weighing between 20 and 200 pounds that contain granular material such as cement, sand, or food stuffs, in preparation for storage or shipment of the packaged merchandise.

2. Prior Art

A bag palletizer loads layers of filled bags onto a pallet in a predetermined pattern. An interlocking relationship of alternating layers of alternating rows and columns of bags is frequently required.

A bag palletizing system is typically a sequential machine operating under the control of a computer or sequential sequencer. The system conventionally has a conveyor feed system for receiving filled bags from a source such as another conveyor. Guides feed the bags onto the moving conveyor of the palletizing apparatus. The guides initially position and locate the bags on the palletizing conveyor to move the bags along a predetermined course to a discharge point onto the pallet.

The pallet is moved after receiving each bag, from the palletizing conveyor to the next position for receiving the next bag. Movement of the pallet is also under spacial computer sequential control with motion of the pallet being controlled in an X, Y and Z coordinate system to accommodate the size of the bag, the speed of the conveyor, the texture and density of the material in the bags, the bag material and finally the desired pattern to be formed by the bags as they leave the conveyor and are deposited on the pallet.

Bag palletizing systems are designed to assist in stacking bags on a pallet with minimum assistance from loading personal. The bags are always positioned on the pallet to form a rectangle; therefore, precise orientation of the bags to align the longitudinal axis of the bag on a precise track parallel to the direction of motion of the palletizer conveyor or along an axis transverse to the direction of motion of the palletizer conveyor is required to reduce the assistance required from the bag stacking personnel.

Precise rotation of the bag while the bag is moving on the palletizer conveyor is critical to precise stacking and to minimizing the possibility of damage to the moving bag. Systems of early design used manually operated guides or manual force to rotate the bags to a correct orientation as they moved along the bag stacker conveyor. Poor accuracy and bag damage frequently resulted from manually controlled bag turning means.

A post was used as a bag turner on early bag stacking systems. The post was positioned off the center path of the bag on the palletizing conveyor. As the bag reached the post-type, a corner of the bag would be stopped by the post allowing the bag to pivot on the moving conveyor surface as the conveyor moved the bag past the post. The post-type bag turning apparatus had a speed limitation. The speed of the conveyor had to be reduced to prevent damage to the bags as they impacted the post prior to rotation. The post-type bag turner also proved to be unsatisfactory for use with plastic bags due to its tendency to damage plastic bags even at relatively low speeds.

A pop-up turntable has also been used in connection with palletizing conveyors to turn bags. As the bags reached the turntable, the turntable would pop up under the bag, to support the bag and to rotate the bag to position the longitudinal axis of the bag to be transverse with the motion of the palletizing conveyor. Pop-up turntable bag turners proved to be more complex than the post turners. The pop-up bag turners had many more parts and parts that were much more expensive to fabricate.

The post type had a maximum speed limit of approximately 30 bags per minute. The pop-up bag turners had a maximum speed limit of approximately 20 bags per minute without damaging the paper bags. The bag turner has proved to be the factor that most significantly limits the speed of bag palletizing systems.

SUMMARY OF INVENTION

It is an object of this invention to provide an improved bag turner and bag turning method that will make it possible to increase the design speed of a bag palletizing system to more than 20 bags per minute. It is another object of this invention to provide an improved bag turner that will work as well with plastic as with paper bags, and which can be re-timed to operate with different weights or different materials with a single switch. It is another object of the invention to provide a turner that is easily adjusted to turn bags with different weights and densities.

In accordance with a preferred embodiment of the present invention, a bag turner comprises a bag turning wheel mounted to rotate in a level plane above a moving conveyor. The term "wheel" as used in connection with the phrase "bag turning wheel" is used figuretively, and is meant to include any structural shape capable of performing the required function. The bag turning wheel has radial members extending from the hub of the wheel at an angle selected to receive and contact a bag at the end of a first radial member. The bag turning wheel and associated drive apparatus are mounted on a carriage which is lowered to a height above the conveyor moving surface to permit the bags to engage the radial member as the bag reaches the turner. A clutch is engaged to cause a motor and transmission to rotate the wheel at a speed selected to permit the bag turning wheel to engage the trailing edge of the bag on the conveyor with its second radial element and to rotate the bag from a first orientation on the conveyor surface to a second orientation as the bag moves past the bag turning wheel.

The apparatus is raised to a top limit position allowing bags to pass un-turned under the bag turning wheel until a subsequent series to be turned is detected approaching the bag turning wheel.

BRIEF DESCRIPTION OF THE DRAWINGS

FIG. 1 is a front elevation of a bag turner in accordance with a preferred embodiment of the present invention, showing the bag turning wheel in raised position;

FIG. 2 is a side elevation of the bag turner showing the bag-turning wheel and carriage assembly in raised position;

FIG. 3 is a side elevation of the bag turning wheel showing the bag-turning wheel and carriage assembly in a lowered position.

FIG. 4 is a view taken along line 4—4 of FIG. 1, showing the motor, transmission, wheel chain drive, and speed reducing apparatus used in the present invention;

FIG. 5 is a view taken along line 5—5 of FIG. 1 showing the bag-turning wheel position indicator mounting plate used in the present invention.

FIG. 6 is a view taken along line 6—6 of FIG. 1 showing the positioning disk surrounded by three proximity switches, as used in the preferred embodiment of the present invention;

FIG. 7 is a view taken along line 7—7 of FIG. 1, of the bag-turning wheel used in the present invention, with a portion cut away to show a first and second radial member separated by an angle A.

FIG. 8 is a horizontal sectional view of a radial element, taken along line 8—8 in FIG. 1;

FIG. 9 is a vertical sectional view of a radial element, taken along line 9—9 in FIG. 8;

FIG. 10 is a vertical sectional view of a spring on a radial element, taken along line 10—10 in FIG. 8;

FIG. 11 is a vertical sectional view of a hinge on a radial element, taken along line 11—11 in FIG. 8;

FIG. 12 is a plan view of a bag moving on a conveyor and contacting the bag receiving element of the bag-turning wheel;

DETAILED DESCRIPTION OF A PREFERRED EMBODIMENT

Figure 13:
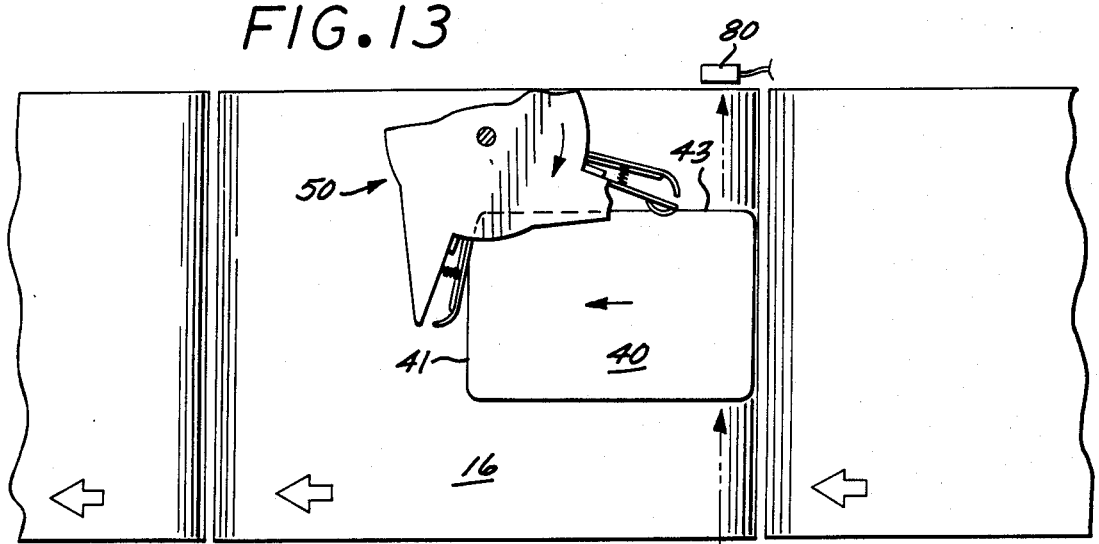
FIG. 13 is a plan view of a bag moving on a conveyor, the bag turning wheel having rotated to a first orientation to permit the bag-turning radial element to contact the trailing edge of the bag.
Figure 14:
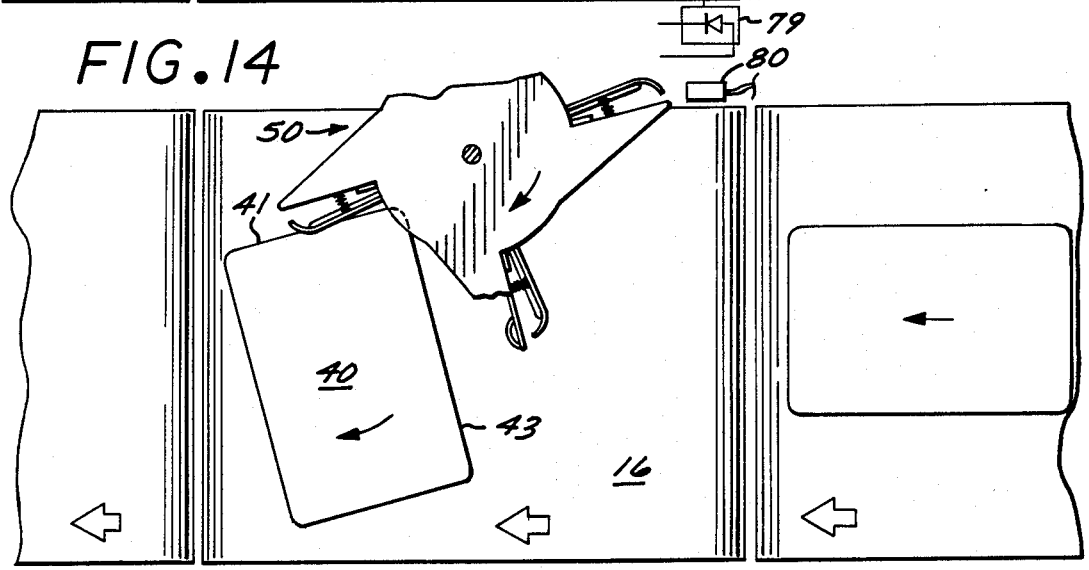
FIG. 14 is a plan view of a bag moving on a conveyor, the bag turning wheel having rotated to a second position, the bag having turned and continuing to pivot on the bag-receiving radial element as it moves past the wheel.
Figure 15:
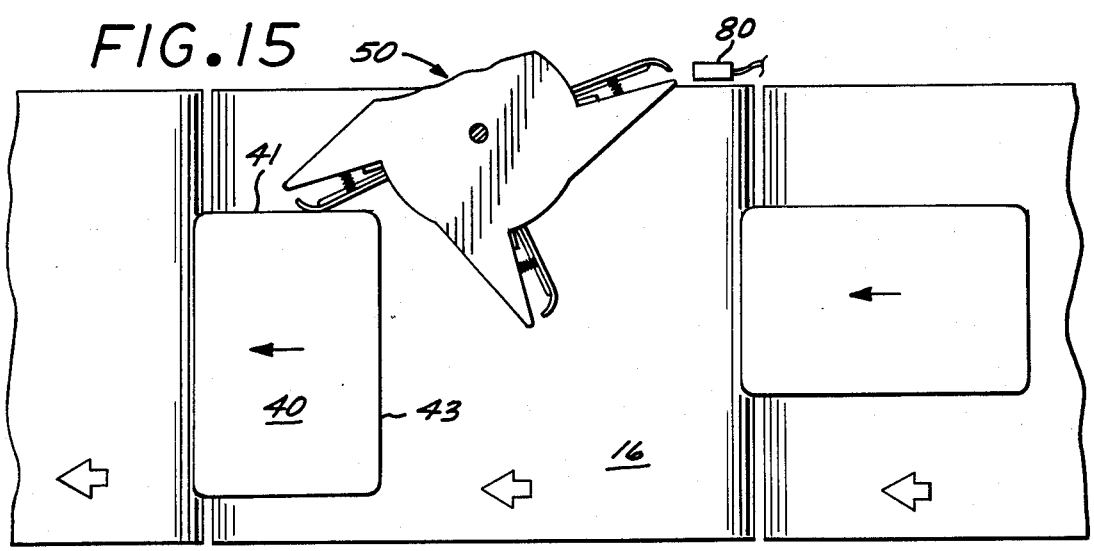
FIG. 15 is a plan view of a bag moving on a conveyor, the bag-turning wheel having rotated to a third orientation, the bag having completed its rotation.

FIGS. 1 and 2 show a bag turning apparatus 10 in accordance with a preferred embodiment of the present invention, as used with a bag palletizing system. FIG. 2 shows a frame 12 to the right of a conveyor 14. The conveyor 14 has a substantially horizontal moving surface 16 supported in fixed relation with the frame 12. The conveyor moving surface 16 is constrained to prevent its lateral movement, and transfers movement to objects, such as bags, on its surface. The conveyed objects are thus moved along a single track or path.

The frame 12 is coupled to the conveyor 14 or in the alternative, both frame and conveyor are anchored to a floor 18. The horizontal moving surface 16 is positioned to receive bags from a bag feed source such as another conveyor (not shown).

Referring to FIG. 12, a bag 40 typically has a predetermined longitudinal orientation with respect to the motion of the conveyor horizontal moving surface 16. The bag is typically orientated to have its longitudinal axis 42 aligned with a center line 44 or central axis of the horizontal moving surface 16, the moving surface moving the bags to a predetermined discharge point (not shown).

FIGS. 1, 2 and 3 show a carriage 20 that is movably mounted on a pair of rods or guides 22, 23. Each of the guides passes through a top pillow block 24 and bottom pillow block 25, attached to the carriage 20. Brackets, such as a top bracket 26 and a bottom bracket 27, fix the guides to the frame 12.

The guides 22, 23, in combination with the associated pillow blocks and brackets, represent a linear coupling means for coupling the carriage 20 to the frame 12. The carriage 20 is thus movable vertically on guides 22, 23. The guides are suitably dimensioned and are positioned on the frame 12 to enable the carriage 20 to move between a predetermined top limit position (as shown in FIG. 2) and a bottom limit position (as shown in FIG. 3) with respect to the frame 12.

FIGS. 1 and 4 show a motor 28. The motor 28 is operatively coupled to carriage 20 and has a continuously running shaft (not shown). The motor selected is preferably rated at about 1.0 BHP and operates at, typically, about 1800 RPM.

FIGS. 1-4 show a transmission 30, a drive gear 31, a chain 32, and a transfer gear 33 which represent a transmission means for coupling the continuously running shaft (not shown) of the motor 28 to a substantially vertical shaft 34 supported on the carriage 20 by a pair of pillow blocks 48 and 49. The transmission means provides the additional function of reducing the rotational velocity of the substantially vertical shaft 34 with respect to the rotational velocity of the continuously running motor shaft.

FIG. 7 shows a bag turning wheel 50 in top plan view, having an axis of rotation common with vertical shaft 34. FIG. 8 shows a sectional view of a first radial member 53a of the bag turning wheel 50, taken along line 8—8 in FIG. 1. As best shown in FIG. 8, the first radial member 53a comprises a fixed radial element or fixed turning bumper 57b extending from a hub 56. The hub 56 of the radial member 53a is locked onto the vertical shaft 34 (shown in partial in cutaway section in FIG. 8). The vertical shaft 34 rotates hub 56, which in turn rotates the bag turning wheel 50 in a substantially level plane. The shaft 34 is substantially normal or perpendicular to the plane of revolution of the bag-turning wheel 50.

As shown in FIG. 8 and 9, the turning bumper 57b is fixed at one end to the hub 56, preferably by welding. A receiving bumper 57a is pivotally connected to the turning bumper by a pivot mechanism, to be described below. Welded to the inner surface of the turning bumper 54 is a pair of stiffening members 59. A single stiffening member 61 is welded to the inner surface of the receiving bumper 57.

The pivot mechanism comprises a pair of vertically separated turning bumper sleeves 64 that are welded to the inner surface of the turning bumper 54. A receiving bumper sleeve 65 is welded to the inner surface of the receiving bumper 57 and is interposed between the two turning bumper sleeves 64. A pivot shaft 67 is journaled in the vertically-aligned sleeves 64 and 65. The sleeves 64, in cooperation with bumper pivot shaft 67 form a pivot means for pivoting the receiving bumper on the surface of the turning bumper 54. Other pivoting arrangements such as flexure membranes, conventional hinges and the like are recognized as alternatives to the pivot arrangement shown.

The operation of the springs in cooperation with the pivot means allows the bag receiving bumper 62 to adsorb the impact of the without damaging the bag. Springs can be added or removed as the load dictates. The structure is predictable and manufactureable without the imposition of tight tolerances or critical adjustments.

Referring again to FIG. 7, the bag turning wheel 50 is shown in plan view with its top sheet cut away to expose a first and second radial member 53a and 53b respectively. Each radial member extends from the hub 56 in a horizontal plane separated by separation angle A to form an interior angle B defining a segment into which a bag is received.

The first radial member 53a has a vertically disposed bag receiving bumper 57a extending a predetermined distance from the periphery of the hub and a second radial member 53b having a vertically disposed bag turning bumper 57b extending at a second predetermined distance from the periphery of the hub. In the preferred embodiment, the length of the bag receiving bumper 57a and the bag turning bumpers 57b are approximately equal. The bag receiving and bag turning bumpers 57a, 57b are positioned to face internal to the interior angle B.

Referring to FIGS. 2 and 3, a cylinder 36, a piston shaft 37, a yoke 38 and a pinned flange plate 39, in combination with a source of pressure (not shown) represent a vertical actuator means 35 coupled between the frame 12 and the carriage 20.

The piston shaft 37 typically has a reciprocally driven piston within the cylinder 36 that responds to a pneumatic or hydraulic source of pressure (not shown) to drive piston shaft 37 to a retracted or extended position. FIG. 2 shows the shaft in the retracted position to raise the carriage 20, and FIG. 3 shows the shaft in the extended position to lower the carriage 20. The bag turning wheel 50 is raised with the piston shaft 37 in the retracted position as in FIG. 2, and is lowered with the piston shaft 37 is the extended position as in FIG. 3.

The pressure source applies pressure to the bottom side of the piston in response to a "wheel up" command signal supplied to an electrically-controlled valve (not shown), to drive the piston shaft 37 up into a retracted position.

In an alternative embodiment, the piston shaft 37 is positively driven to the retracted position. The bag turning wheel is lowered by applying a "wheel down" command signal to a valve to release the pressure source to allow the carriage 20 to descend under the control of gravity. The wheel down command is fed to an electrically controlled valve (not shown) to lower the bag turning wheel.

The vertical actuator means 35 responds to a "wheel up" command signal by moving the carriage 20 to a predetermined top limit position at a height C above the conveyor moving surface 16, as shown in FIGS. 1 and 2, to permit a bag 40 (shown in phantom), on the conveyor moving surface to pass under the bag turning wheel 50, free of contact with the bag turning wheel. The vertical actuator means responds to a "wheel down" command signal by moving the carriage to the bottom limit position D as shown in FIG. 3. In this position, the bag turning wheel 50, including the bag receiving bumper 57a and the bag turning bumper 57b are at a level above the conveyor moving surface 16 to permit positive engagement with a received bag. FIGS. 12 depicts the bag receiving bumper 57b, contacting the front surface 41 and side surface 43 of bag 40 moving on the conveyor moving surface 16.

A wheel position means is shown in FIGS. 3, 5 and 6. The wheel position means comprises a mounting plate support 82 coupled to the carriage 20 and welded to a proximity mounting plate 83. The proximity mounting plate 83 is shown to be horizontally positioned above the vertical shaft 34 in FIG. 3. A proximity switch mounting plate flange 85 is shown supported under the proximity mounting plate 83 by plate flange bolts 86. A proximity switch 87 extends through a hole in the proximity switch mounting plate flange 85, its sensing surface being positioned to sense cam surfaces 88 on a positioning disc 89. The positioning disc 89 is coupled to the vertical shaft 34. The timing of the switches is adjusted by releasing tension on the flange bolts 87 and moving the proximity switch mounting plate flange 85 through an arc around the disc by sliding the bolts through corresponding adjusting slots 90.

The adjusting slots 90 permit the machine to be quickly retimed for alternate bag types and loads. The wheel positioning means is referenced to the frame for providing a wheel position signal to indicate when the bag turning wheel is at an initial reference rotation with respect to the direction of movement of the conveyor.

FIG. 6 depicts the use of three (3) proximity switches. Magnetic proximity switches by the Turk Multiprox Inc. of Minneapolis, MN have been used successfully, however, photoelectric and mechanical switches can accommodate the needs of the application. The number of proximity switches used will depend on the angle of rotation that the bag turning wheel 50 is required to turn through with each bag turning cycle. The bag turning wheel of FIG. 7 is intended to provide four bag turning cycles for each bag turning wheel rotation. In such an arrangement four proximity switches are used.

Figure 16:
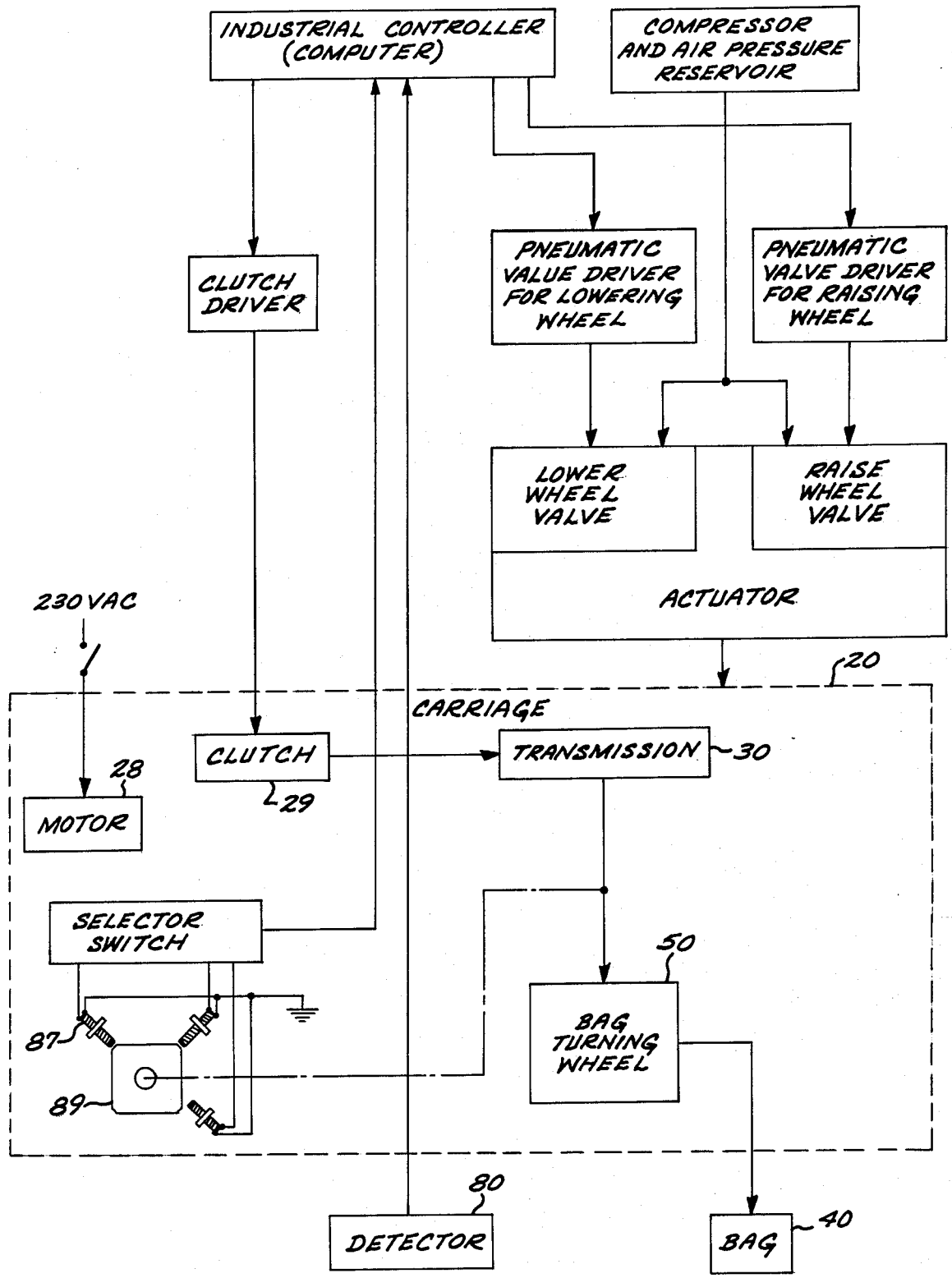
FIG. 16 is a block diagram of the bag turning apparatus and peripheral elements.
Figure 17:
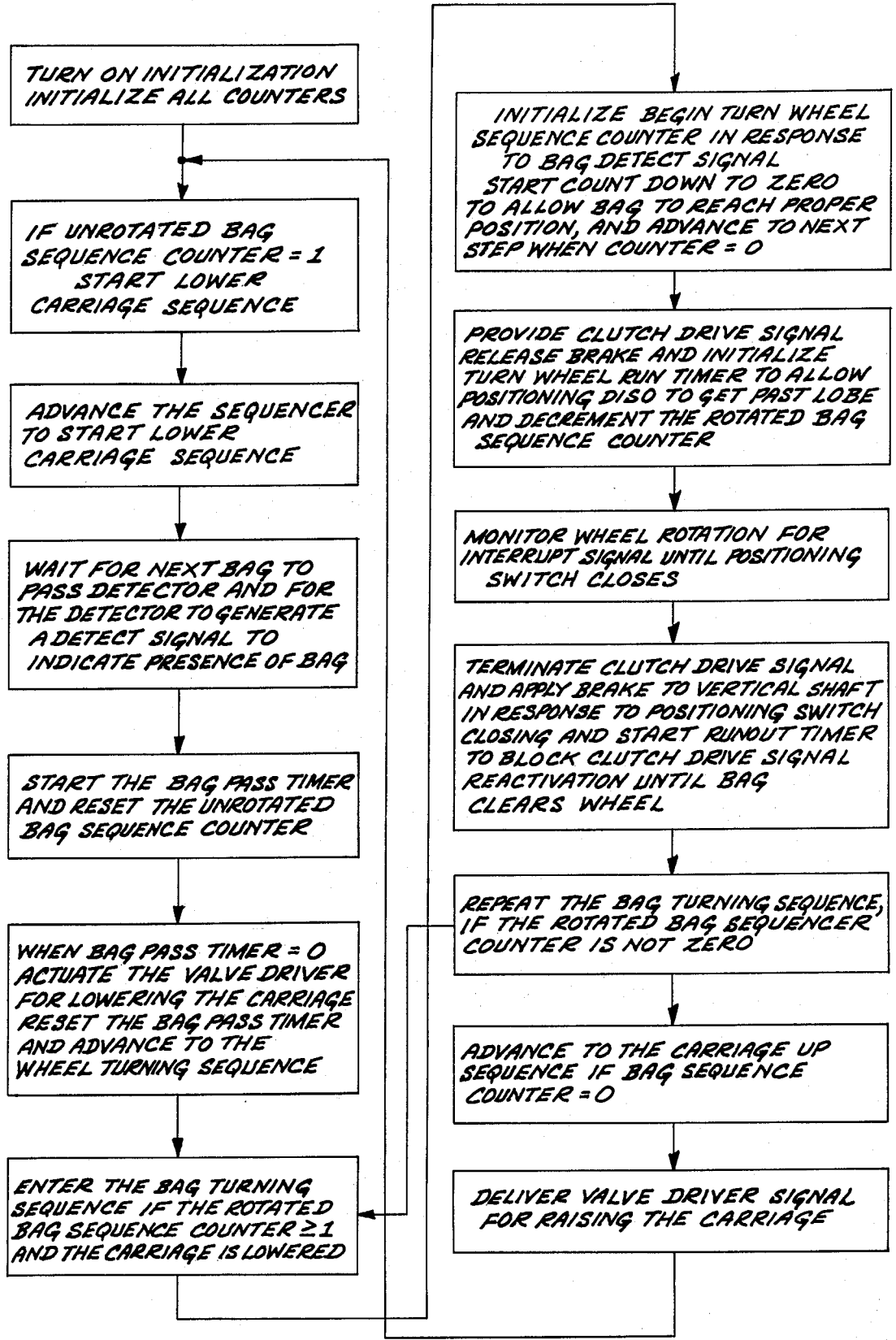
FIG. 17 is a block diagram showing the control process steps for bag turning.

The switches are wired to a selector switch as shown in FIG. 16. The selector switch selects the switch for a particular bag load since different bags will be handled on the same line at different times. In this way, the bag turning machine can be set to turn bags of a different type and load by selecting the proximity switch that is timed for that particular load without retiming the machine.

Another advantage of the invention bag turner is that only one of the switches or a pair of the switches might be used for a first bag type allowing the remaining proximity switches to be timed to service an alternate bag type. The machine can be quickly adapted for either type by electrically selecting the switch or pair of switches required for the load thereby eliminating the need to perform mechanical adjustments on the machine.

Referring to FIG. 4, reference number 29 designates the location of a clutch and brake means coupled to the carriage 20 via the motor and transmission cases for coupling the continuously running shaft to the bag turning wheel to the vertical shaft 34 to rotate the bag turning wheel from a first predetermined rotational position to a second predetermined rotational position. The clutch is engaged in response to the clutch control signal. The shaft input into the transmission 30 is stopped on removal of the clutch control signal by operation of a brake within the clutch and brake assembly 29. The brake operates to stop the rotation of the bag turning wheel 50 with respect to the carriage in response to removal of the clutch control signal. The clutch and brake means is typically a commercial unit.

Detector block 80 in FIG. 12 represents a bag detection means such as a scanner system or photo electric or LED (light emitting diode) arrangement of a transmitter and detector by the Banner Inc. The scanner provides a start signal in response to detecting a bag passing a predetermined location on the conveyor. The scanner system used comprised a model SBRX Receiver within a model PBAT wire block, a PBAT wire block and an LM-3 logic module with a UCLJ lens. The receiver is a photoelectric device. The receiver responds to light emitted signals from an LED within a Banner model SBEX scanner block (not shown) using a PBA1 wire block and a UCLJ lens.

A Westinghouse model 1100 is used in the preferred embodiment as a control means. This unit is a computer or industrial controller used for the sequential control of the palletizing system as well as the bag turning apparatus. The control and timing means provides a carriage down command signal to the pneumatic valve driver shown in FIG. 16 to lower the carriage in response to a first predetermined sequence of start signals and for providing an up command signal to the actuator means to raise the carriage in response to a second predetermined sequence of start signals.

Each start signal, that occurs while the control and timing means is providing a down command signal, initiates a bag turning cycle. The control and timing means is coupled to the start signals from detector 80 and is programmed to respond to the start of each bag turning cycle by providing a clutch drive signal, after a predetermined delay, to the clutch and brake means to engage the clutch and to release the brake. Each clutch drive signal is timed to commence rotation of the bag turning wheel concurrent with the bag front surface reaching the bag receiving bumper.

The transmission 30 has a selected ratio and the conveyor surface speed is selected by design to match the speed of rotation of the bag turning wheel 50 in relation to the speed of the conveyor moving surface 16 to permit the bag receiving bumper to receive and maintain contact with the bag front surface 41 through a predetermined bag control wheel rotation. The bag turning bumper is positioned to move the second radial 53b through an arc of rotation on the second radial to engage the side of the bag 43 at a point to the rear of the bag.

The point of engagement is selected to permit the bag turning bumper to drive the bag side surface through a predetermined arc. The bag turning bumper 57b contacts the bag at a bag turning pad 62 and slides the rear of the bag on the moving conveyor surface initially in a direction transverse to the moving surface 16 direction of movement. The bag front surface 41 initially pivots and subsequently slides on the bag receiving bumper 57a as the conveyor moving surface 16 moves the bag past the bag receiving pad 63. The motion of the bag turning bumper 57b and the bag receiving bumper 57a cooperate with the motion of the conveyor moving surface 16 and the front and side surfaces of the bag to rotate the bag to a predetermined angle with respect to the direction of movement of the conveyor surface. The cooperation of these factors and elements also positions the bag on a predetermined track on the conveyor surface at the instant the bag looses contact with the bag receiving bumper 57a.

The control and timing means interrupts the clutch drive signal to position the bag turning wheel to be at the initial reference rotation position required for receiving the next bag in response to a wheel position signal from a proximity switch 87.

For proper and efficient operation, the bags are typically sized in length and width to enable the bag palletizing system using the invention bag turner to stack the bags in interlocking layers by rotating bags in periodic sequences of bags through a 90 degree rotation prior to discharging the sequence onto the pallet.

The combined motion of the palletizing conveyor and the pallet operate under the sequential control of an industrial controller such as a Westinghouse Model 1100 to permit the palletizing system to form a series of alternating layers of alternating rows and columns of bags on each pallet loaded. Bag turning machines can be built to turn bags at various rates such as 10, 15, 25 and 40 bags per minute. A 40 bag per minute machine is typically rated for series of bags of 5 or more.

An interleaved stack of bags is formed by loading a first predetermined number of bags onto a moving pallet along a first axis. The location of the pallet is changed to permit it to receive second predetermined number of bags are then loaded onto the pallet along a second axis orthogonal to the first axis. This process is continued until the stack of bags has reached the required height for the pallet load.

While a single embodiment of the present invention has been shown and described, it will be apparent to those skilled in the art that various changes and modifications may be made without departing from the invention in its broader aspects. Such modifications and improvements are contemplated in the appended claims to cover all such changes and modifications as fall within the true spirit and scope of the present invention.

I claim:

1. A bag turning apparatus for rotating a bag having a front and side surface and moving along a path on a conveyor, comprising:

a bag turning wheel having an axis of rotation substantially normal to the plane of said conveyor and offset to the side of the path of the bags, said wheel including first and second radial members, extending from said axis in a horizontal plane to form a substantially right angle, means for (a) lowering said bag turning wheel to permit said first radial member to engage a bag moving on said conveyor and (b) turning said bag turning wheel to permit said second member to drive said bag side surface through a predetermined arc and to position said bag to have a predetermined orientation and to be moving on a predetermined track on said conveyor surface as the bag loses contact with said radial member; and means for raising said bag turning wheel to permit free passage of said bags on said conveyor.

2. A bag turning apparatus for use with a bag palletizing system, said bag turner comprising:

a conveyor for moving bags along a path to a predetermined discharge point;

a bag turning wheel having an axis of rotation positioned substantially normal to the plane of said conveyor and to the side of the path of the bags and having a first radial member having a bag receiving bumper and a second radial member having a bag turning bumper, said first and second radial members extending in a horizontal plane to form an interior angle, each bumper being positioned on its respective radial member to face inwardly to said interior angle, means for (a) lowering said bag turning wheel and orientating said rotational axis to position said first radial member to extend substantially transversely to the motion of said conveyor to permit said bag receiving bumper to engage a bag moving on said conveyor and (b) turning said bag turning wheel as the bag front surface reaches said bag receiving bumper, the rotation of said bag turning wheel thereby bringing said bag into contact with said bag receiving bumper, said bag turning bumper being positioned to engage the side of said bag to drive said bag side surface through a predetermined arc contemporaneous with the motion of said conveyor surface and to position said bag to have a predetermined orientation and to be moving on a predetermined track on said conveyor surface when the bag loses contact with the bag receiving bumper; and means for raising said bag turning wheel to permit free passage of said bags on said conveyor.

3. A method for rotating a bag having a front and side surface and moving along a path on a conveyor, comprising the following steps:
   A. determining if a bag moving on the conveyor is the first in a series to be rotated and advancing to step B if it is;
   B. lowering a bag turning wheel to have a first radial member of the wheel engage a bag moving on said conveyor;
   C. rotating said bag turning wheel to have a second radial member drive said bag side surface through a predetermined arc;
   D. stopping the bag turning wheel in response to its arrival at a predetermined rotational position to position said first radial member to receive the next bag on the conveyor;
   E. detecting the presence of the next approaching bag and determining if it is the last bag in a series to be turned;
   F. repeating steps C, D and E if the next detected bag is to be rotated, and advancing to step G if the next bag is the last bag in a series to be turned; and
   G. raising the bag turning wheel to be out of the path of bags passing on said conveyor.

4. The bag turning apparatus of claim 1, wherein said means for lowering and turning said bag turning wheel member further comprises:
   clutch and brake means, actuable in response to a clutch control signal, for coupling a continuously running shaft to a vertical shaft having a top and bottom end, said vertical shaft being positioned to be coaxial with said bag turning wheel axis of rotation and coupled to said bag turning wheel to rotate said bag turning wheel in response to the actuation of said clutch and brake means.

5. The bag turning apparatus of claim 4 wherein said means for lowering and turning said bag turning wheel member further comprises:
   bag detection means for providing a start signal in response to a bag moving past a predetermined location on said conveyor; and
   control means, responsive to said start signal for providing said clutch control signal to said clutch and brake means.

6. The bag turning apparatus of claim 4 wherein said means for lowering and turning said bag turning wheel member further comprises:
   wheel position means, coupled to said vertical shaft for providing a wheel position signal to indicate that the bag turning wheel is at an initial reference rotation position with respect to the direction of movement of said conveyor.

7. The bag turning apparatus of claim 6 wherein said means for lowering and turning said bag turning wheel member further comprises:
   bag detection means for providing a start signal in response to a bag moving past a predetermined location on said conveyor; and
   control means, responsive to said start signal for providing said control signal to said clutch and brake means to actuate said clutch and brake means to initiate rotation of said bag turning wheel, and for interrupting said control signal to deactuate said clutch and brake means in response to said wheel position signal to terminate rotation of said bag turning wheel at said initial reference rotation position.

8. The bag turning apparatus of claim 1, wherein said means for lowering and turning said bag turning wheel member further comprises:
   bag detection means for providing a start signal in response to a bag moving past a predetermined location on said conveyor; and
   control means responsive to a sequential program and to each start signal for providing a wheel up signal as the count of start signals exceed a predetermined limit;
   and wherein said means for raising said bag turning wheel further comprises:
   a frame;
   a carriage coupled to said frame to move vertically with respect to the frame, said bag turning wheel being coupled to said carriage;
   pressure source means responsive to said wheel up signal for supplying pressure; and
   actuator means responsive to said pressure for raising said carriage to the up position to allow bags to pass under said bag turning wheel on said conveyor.

9. The bag turning apparatus of claim 4, wherein said bag turning wheel further comprises a hub axially coupled to said vertical shaft bottom end; and wherein said first and second radial members each further include:
   a fixed turning bumper extending from said hub in a substantially level plane;
   a receiving bumper extending from said hub in a substantially level plane; and
   pivot means coupled to said fixed turning bumper for pivotally coupling said receiving bumper to said fixed turning bumper to pivot said receiving bumper toward said fixed turning bumper in response to a bag contacting said receiving bumper.

10. The bag turning apparatus of claim 9, wherein said fixed turning bumper further comprises:
    a bag turning pad positioned to face the direction of motion of said fixed turning bumper, the surface of said bag turning pad being located to contact the side of said bag without damaging said bag.

11. The bag turning apparatus of claim 9 wherein said bag turning wheel further comprises:
    at least one spring removably positioned between said fixed turning bumper and said receiving bumper to absorb the impact of a bag striking said receiving bumper as said bag contacts said bag receiving bumper.

12. The bag turning apparatus of claim 9, wherein said bag turning wheel further comprises:
    spring means positioned between said fixed turning bumper and said receiving bumper for absorbing the impact of a bag striking said receiving bumper as said receiving bumper pivots toward said fixed turning bumper in response to contact with said bag.

13. The bag turning apparatus of claim 12, wherein said spring means further comprises:
   a plurality of coil springs positioned between said fixed turning bumper and said receiving bumper, said coil springs being selected to absorb the impact of a bag striking said receiving bumper and to avoid damage to the bag.

14. The bag turning apparatus of claim 9, wherein said means for lowering and turning said bag turning wheel member further comprises:
   bag detection means for providing a start signal in response to a bag moving past a predetermined location on said conveyor; and,
   control means responsive to said start signal for providing said control signal to said clutch and brake means to actuate said clutch and brake means.

15. The bag turning apparatus of claim 9, wherein said means for lowering and turning said bag turning wheel member further comprises:
   wheel position means coupled to said vertical shaft for providing a wheel position signal to indicate that the bag turning wheel is at an initial reference rotation position with respect to the direction of movement of said conveyor.

16. The bag turning apparatus of claim 15, wherein said means for lowering and turning said bag turning wheel member further comprises:
   bag detection means for providing a start signal in response to a bag moving past a predetermined location on said conveyor; and
   control means, responsive to said start signal, for providing said control signal to said clutch and brake means to actuate said clutch and brake means to initiate rotation of said bag turning wheel, and for interrupting said control signal to deactuate said clutch and brake means in response to said wheel position signal to terminate rotation of said bag turning wheel at said initial reference rotation position.

17. The bag turning apparatus of claim 9 wherein said means for lowering and turning said bag turning wheel member further comprises:
   bag detection means for providing a start signal in response to a bag moving past a predetermined location on said conveyor; and
   control means, responsive to a sequential program and to each start signal, for providing a wheel up signal as the count of start signals exceed a predetermined limit; and wherein said means for raising said bag turning wheel further comprises:
   a frame;
   a carriage coupled to said frame to move vertically with respect to said frame, said bag turning wheel being coupled to said carriage;
   pressure source means responsive to said wheel up signal for supplying fluid pressure; and
   actuator means responsive to said fluid pressure for raising said carriage to allow bags to pass under said bag turning wheel on said conveyor.

18. The bag turning apparatus of claim 17, wherein said wheel position means further comprises:
   a proximity switch mounting plate coupled to said carriage and positioned to be adjacent said vertical shaft, said proximity switch mounting plate carrying at least one proximity switch adjustably coupled to said proximity mounting plate; and
   a position disc coupled to said vertical shaft top end and having at least one cam lobe moving in a horizontal plane with rotation of said vertical shaft, said proximity switch being adjustable in position to provide said wheel position signal in response to sensing the presence of said cam lobe as said bag turning wheel reaches said initial reference rotation position.

19. The bag turning apparatus of claim 2, further comprising:
   clutch and brake means actuable in response to a clutch control signal, for coupling a continuously running shaft to a vertical shaft having a top and bottom end, said vertical shaft being positioned to be coaxial with said bag turning wheel axis of rotation and coupled to said bag turning wheel to rotate said bag turning wheel in response to the actuation of said clutch and brake means; and
   a hub axially coupled to said vertical shaft bottom end;
   wherein said first and second radial members each further comprise a fixed turning bumper extending from said hub in a substantially level plane;
   a receiving bumper extending from said hub in a substantially level plane; and
   pivot means, coupled to said fixed turning bumper, for pivotally coupling said receiving bumper to said fixed turning bumper to pivot said receiving bumper toward said fixed turning bumper in response to a bag contacting said receiving bumper.

20. The bag turning apparatus of claim 19 wherein each of said fixed turning bumpers further comprise:
   a bag turning pad positioned to face the direction of motion of said fixed turning bumper, the surface of said bag turning pad being located to contact the side of said bag without damaging said bag.

* * * * *